(12) United States Patent
Stewart

(10) Patent No.: US 7,195,161 B2
(45) Date of Patent: Mar. 27, 2007

(54) SMART CARD READER

(75) Inventor: Christopher Stewart, Tamarac, FL (US)

(73) Assignee: The DirecTV Group, Inc., El Segundo, CA (US)

( * ) Notice: Subject to any disclaimer, the term of this patent is extended or adjusted under 35 U.S.C. 154(b) by 122 days.

(21) Appl. No.: 10/723,617

(22) Filed: Nov. 25, 2003

(65) Prior Publication Data

US 2005/0061884 A1    Mar. 24, 2005

Related U.S. Application Data

(60) Provisional application No. 60/503,911, filed on Sep. 18, 2003.

(51) Int. Cl.
*G06K 7/08* (2006.01)

(52) U.S. Cl. .................. 235/451; 235/492; 235/486

(58) Field of Classification Search ............. 235/451, 235/492, 486, 374, 380, 488, 441, 449
See application file for complete search history.

(56) References Cited

U.S. PATENT DOCUMENTS

| | | | | |
|---|---|---|---|---|
| 5,015,830 A | * | 5/1991 | Masuzawa et al. | 235/441 |
| 5,091,618 A | * | 2/1992 | Takahashi | 235/441 |
| 5,331,139 A | * | 7/1994 | Lee | 235/449 |
| 5,511,986 A | * | 4/1996 | Casey et al. | 439/188 |
| 5,729,000 A | * | 3/1998 | Sugimoto | 235/441 |
| 5,872,353 A | * | 2/1999 | Reichardt et al. | 235/441 |
| 5,898,159 A | * | 4/1999 | Huang | 235/441 |
| 5,936,222 A | * | 8/1999 | Korsunsky et al. | 235/441 |
| 6,006,987 A | * | 12/1999 | Hoolhorst | 235/375 |
| 6,105,868 A | * | 8/2000 | Reichardt | 235/441 |
| 6,267,295 B1 | * | 7/2001 | Amagai et al. | 235/486 |
| D454,875 S | * | 3/2002 | McDowell et al. | D14/385 |

* cited by examiner

*Primary Examiner*—Steven S. Paik
(74) *Attorney, Agent, or Firm*—Georgann S. Grunebach

(57) ABSTRACT

The present invention relates to a smart card reader (10) that enables a user to insert a smart card (20) into an open receptacle (15) that includes tabs (16) or a lip (32) that resiliently holds the smart card (20) within the receptacle (15). The present invention provides users a novel and useful design to reduce smart card abrasion as opposed to the card readers of the prior art. The present invention relates to a card reader (10) for usage with a smart card (20) comprising: a receptacle (15), where the receptacle (15) includes at least one open side; at least one placement tab (16), where the at least one placement tab (16) extends into the receptacle (15) and secures the placement of the smart card (20) in the receptacle (15); and a plurality of contacts (18) residing within the receptacle (15) where the plurality of contacts (18) connect to a smart chip (22) within the smart card (20) upon placement of the smart card (20) in the receptacle (15).

6 Claims, 3 Drawing Sheets

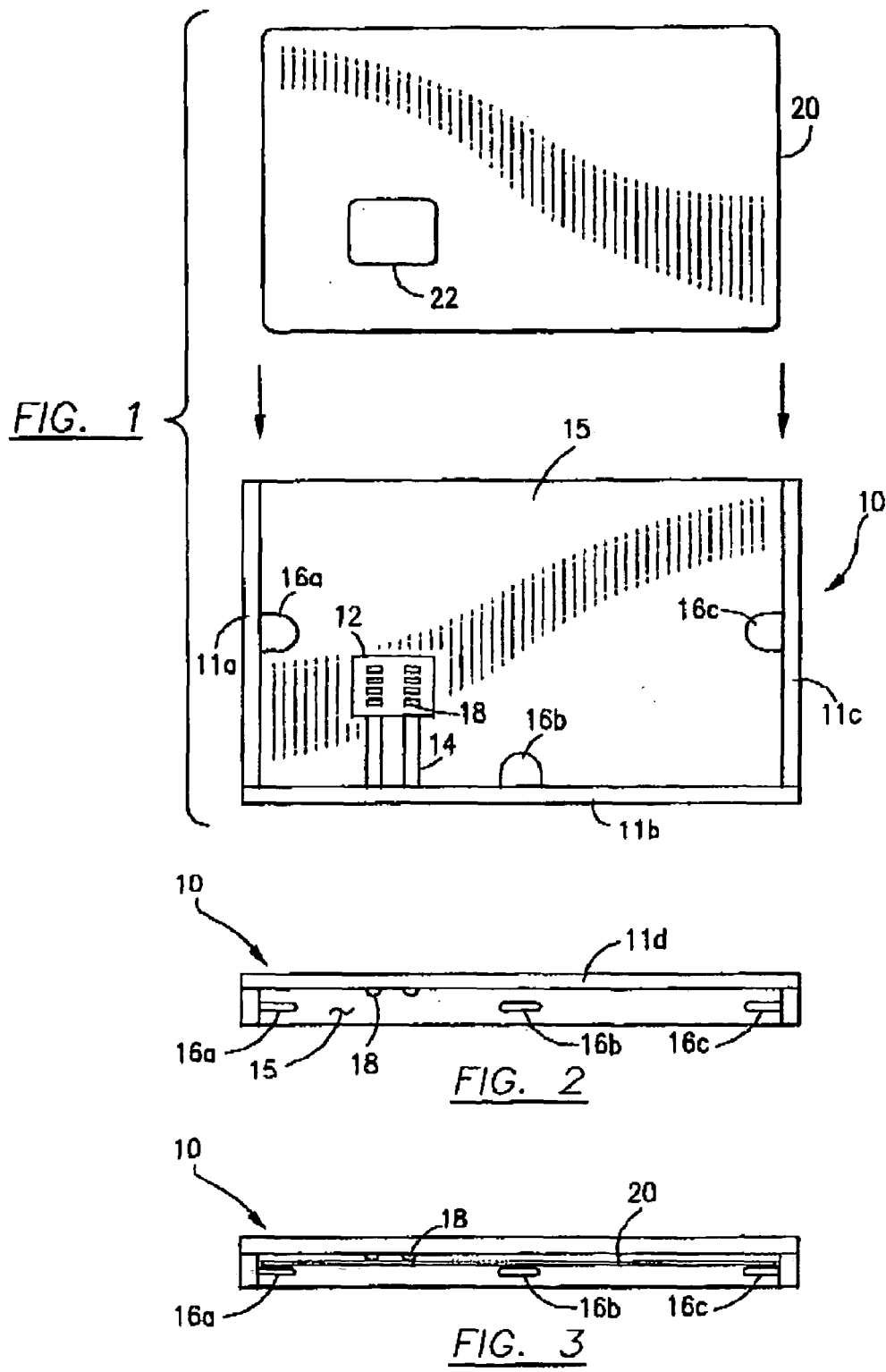

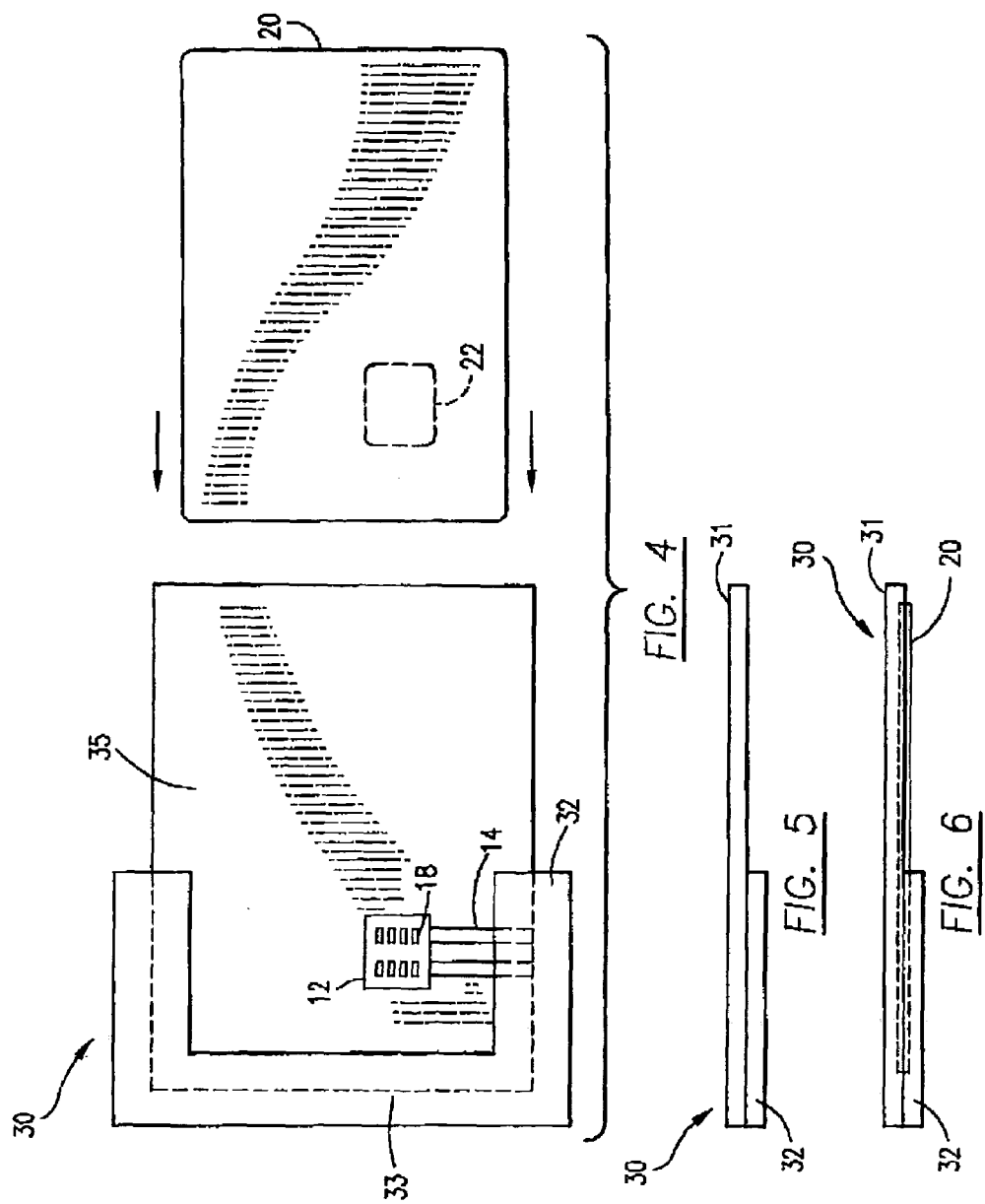

SMART CARD READER

This application claims priority under 35 U.S.C. § 119(e) to U.S. Provisional Application No. 60/503,911, filed on Sep. 18, 2003.

BACKGROUND OF THE INVENTION

1. Field of the Invention

The present relates to a smart card reader that provides a novel configuration for smart card insertion which limits abrasion to the smart card.

2. Description of Related Art

A smart card resembles a credit card in size and shape however, it also includes an embedded eight bit microprocessor in the form of a smart chip. The smart chip included on a smart card provides a means for secured electronic transactions and a means for identification. The embedded chip includes memory and enables the reading and writing of data onto the chip. Advantageously the data may be encrypted for security purposes and, thus, enable the user to use the card within a multitude of applications, such as credit card transactions, computer access capabilities, wireless communications, banking, satellite TV and government identification. The smart cards currently available usually include up to 1 Kb of RAM, 24 Kb of ROM, 16 Kb of programmable ROM and an eight bit microprocessor running usually at about 5 MHz. The smart card uses a serial interface and receives its power from an external source such as a smart card reader. Smart cards are used extensively throughout Europe and have grown in popularity and use in the United States in more recent years.

The physical characteristics of smart cards have been standardized within the ISO standards, specifically, ISO 7816-1. The ISO standards help to provide a uniform smart card throughout the industry. The configuration and placement of the smart chip on the smart card along with the electrical requirements and limits have been set in the ISO standard.

Although smart cards have standards associated with them, smart card readers are not standardized under any standardizing body as of yet. Card readers are subject to the ISO 7816 communication protocol that is associated with smart cards, however designers have a great deal of flexibility in regard to the internal mechanisms and interface of functionality between the smart card reader and other hardware. Presently card readers have numerous designs, however essentially all card readers require the insertion of a smart card into a slot within the card reader. Card readers have contacts within the slot for activation of the smart chip and the transfer of data to and from the smart chip. Many card readers make various design combinations for the smart card slots. Some card readers provide for the insertion of a smart card into an intermediary interface that transmits data to a hardware device. Other smart card readers may permit the insertion of multiple smart cards in a stacked or a cross configuration. As a consequence of repetitive insertion into a card reader slot, the smart cards are subject to a substantial amount of wear and tear over a period of time due to the inherent abrasion that occurs during insertion and removal. Consequently, the premature replacement of the smart chip and/or smart card is required due to the accelerated wear and tear caused by the abrasion.

Smart card readers normally interface smart cards to computers or computer networks for data exchange between the smart card and computer. Readers interface via serial ports, USB ports, PCMCIA slots, floppy disks slots, parallel ports, infrared IRDA ports, keyboards and keyboard wedge readers. Some readers actually perform some processing however, most provide a conduit for data to and from the smart card. Regardless of the interfacing configurations, the smart card readers normally require the insertion of the smart card into an insertion slot.

U.S. Pat. No. 5,750,973 to Kaufman et al. (Kaufman) relates to a card reader where pressure can be applied to a fully inserted card to move the card into engagement with the contacts rather than move the contacts into engagement with the card. Kaufman discloses a card reader that allows a card to be fully inserted before the contacts in the card reader engage the conductive pads on the surface of the card.

U.S. Pat. No. 5,679,007 to Potdevin et al. (Potdevin) relates a portable interface for one or more smart cards where the interface is pluggable into a card reader. Potdevin discusses an interface that allows for the reading of a smart card through a PCMCIA type reader. The interface accommodates the different thicknesses associated with the smart card and a PCMCIA type card.

U.S. Pat. No. 6,015,092 to Postlewaite et al. (Postlewaite) relates to a smart card reader that relates to a smart card reader that includes a smart card holder that is mounted into a PCMCIA card at a ninety-degree angle. Postlewaite shows a smart card reader connected to a PCMCIA card where the smart card reader is substantially normal to the PCMCIA card.

It would be advantageous for users to have a smart card reader which substantially decreases or eliminates the abrasion subjected upon a smart card during use. The decrease or elimination of abrasion could therefore extend the useful life of the smart card and smart chip.

SUMMARY OF THE INVENTION

The present invention provides users with a novel card reader design that enables the insertion of smart cards into an open receptacle. The card reader of the present invention includes a receptacle that includes a means for securely anchoring the smart card for activation and data flow. The configuration of the present invention permits the insertion of the smart card in a reader that minimizes the abrasion and wear upon the smart card.

It is therefore an object of the present invention to provide a card reader for usage with a smart card comprising: a receptacle; at least one placement tab, where the at least one placement tab extends into the receptacle and secures the placement of the smart card in the receptacle; and a plurality of contacts residing within the receptacle where the plurality of contacts connect to a smart chip within the smart card upon placement of the smart card in the receptacle.

It is also an object of the present invention to provide a card reader for usage with a smart card comprising: a receptacle; a receptacle lip extending around three sides of said receptacle and securing the placement of the smart card in the receptacle; and a plurality of contacts residing within the receptacle where the plurality of contacts connect to a smart chip within the smart card upon placement of the smart card in the receptacle.

It is also an object of the present invention to provide a method of smart card interface comprising: providing an open receptacle within a smart card reader; inserting a smart card into the receptacle; placing a contact plate within the smart card reader; aligning the contact plate with a smart chip residing on a smart card; and resiliently connecting the contact plate to the smart chip.

In accordance with these and other objects which will become apparent hereinafter, the instant invention will now be described with particular reference to the accompanying drawings.

BRIEF DESCRIPTION OF THE DRAWINGS

FIG. 1 shows a front elevational exploded view of an exemplary smart card reader and smart card according to the present invention.

FIG. 2 shows a top plan view of an exemplary smart card reader according to the present invention.

FIG. 3 shows the top plan view of the smart card reader according to the present invention with a smart card inserted therein.

FIG. 4 shows a front elevational exploded view of a second exemplary smart card reader and smart card according to the present invention.

FIG. 5 shows a top plan view of the second exemplary smart card reader.

FIG. 6 shows a top plan view of the second exemplary smart card reader according to the present invention with a smart card inserted therein.

DETAILED DESCRIPTION

Figure 7:
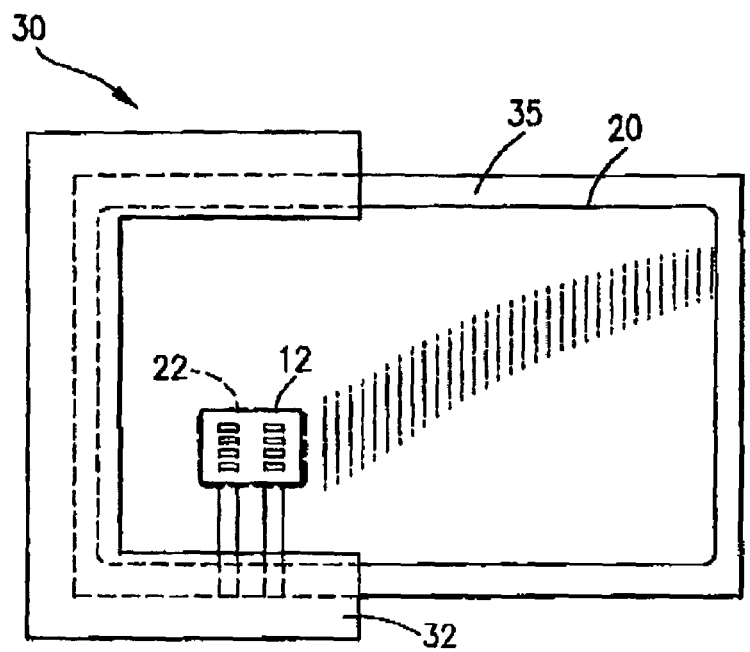
FIG. 7 shows a front elevational view of the second exemplary smart card reader according to the present invention with a smart card inserted therein.

FIG. 1 shows a smart card reader according to the present invention. As shown, a smart card reader 10 receives a smart card 20. A smart card reader 10 includes at least an internal contact plate 12 and connecting wires 14. The connecting wires 14 lead to a further connection device, not shown, that transmits signals from the card reader to a computer or computer network for transfer of data to and from the smart card 20. The bottom longitudinal edge of a smart card 20 leads into a smart card reader 10. The contact plate 12 is aligned within the reader 10 in order to facilitate contact between contacts 18 and the smart chip 22. Contact plate 12 includes a plurality of contacts 18. The card reader 10 may he used in a vertical plane as shown in FIG. 1 or horizontal plane, however regardless of the orientation used, a user inserts the smart card with the longitudinal edge leading into the card reader. The card reader 10 includes two lateral walls, a first lateral wall 11a and a second lateral wall 11c, and a longitudinal wall 11b. The lateral walls 11a, 11c and longitudinal wall 11b define a perimeter wall for a receptacle 15. The card reader of FIG. 1 includes placement tabs 16a, 16b and 16c. The placement tabs 16a, 16b and 16c partially extend from the two lateral walls 11a, 11c and the longitudinal wall 11b. The placement tabs 16a–16c resiliently hold the smart card 20 in place within the receptacle 15. As can be seen from FIG. 2, the smart card reader 10 is three sided, a bottom surface 11d with two lateral walls 11a, 11c; therefore receptacle 15 remains open on one side. The placement tabs 16a–16c apply inward pressure to the smart card 20 and ensures that contact remains constant between the smart chip 22 and contacts 18. The use of the tabs 16a–16c within the open receptacle 15 substantially reduces the abrasion and wear that a smart card is subject to.

FIG. 2 shows a top view of the card reader 10. The receptacle 15 receives the smart card 20 where a user inserts the smart card 20 into the receptacle 15 as shown in FIG. 1. The configuration of the reader 10 provides an alternative to the traditional card reader. The contacts 18 are positioned in the receptacle 15 and provide a means for the activation of the smart chip 22. The contacts 18 lie on the contact plate 12 and electrically communicate with the smart chip 22. FIG. 3 shows another top view of the reader 10 where the smart card 20 is inserted into the receptacle 15. The placement tabs 16a–16c resiliently hold the card 20 in place. The contacts 18 align with the smart chip 22 and activate the functionality associated with the smart card 20.

FIG. 4 shows a second exemplary embodiment of the present invention. A smart card reader 30 receives the smart card 20 along its latitudinal side edge as shown. The smart card 20 is manually inserted into an open receptacle 35 where a receptacle lip 32 extends over the receptacle 35 partially enclosing a small portion at one end of the reader on three sides. The receptacle lip 32 extends over a lateral side of the receptacle 35 and partially over two adjoining longitudinal sides of the receptacle 35 into a portion of the receptacle 35. The receptacle 35 remains substantially open on the opposite side of a bottom surface 31. Similar to the first embodiment, card reader 30 includes the contact pad 12 with contacts 18. The receptacle lip 32 resiliently holds smart card 20 in place. FIGS. 5 and 6 show top views of the card reader 30. FIG. 5 shows an empty card reader 30 and FIG. 6 shows the card reader 30 with smart card 20 inserted therein. The receptacle lip 32 engages the smart card 20 into the receptacle 35 and ensures the smart card 20 remains in contact with the contacts 18. The embodiment of FIG. 4 also reduces abrasion and wear that the smart card 20 is subject to. The lip 32 advantageously applies pressure to a limited area around the outer edge along three sides of the smart card 20. FIG. 7 shows a view of reader 30 where the smart card 20 is inserted into the receptacle 35. The receptacle lip 32 keeps the smart card 20 in place during operation.

The present invention provides a novel system for a smart card reader as opposed to the prior art. Advantageously, the card reader of the present invention enables the user to insert the smart card into a smart card reader that substantially limits the amount of abrasion that the smart card is subject to during operation. The present invention during operation leaves a side of the smart card substantially open and uses either tabs or a lip that apply pressure to the smart card. The present invention therefore limits wear and tear the smart card is subjected while being inserted in and out of the card reader.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A card reader for usage with a smart card to reduce card abrasion comprising:
    a an open receptacle, where the receptacle includes at least air open side, a bottom surface, a first lateral wall, a second lateral wall and a longitudinal wall;
    at least one placement tab, where the at least one placement tab extends from the first lateral wall, the second lateral wall and longitudinal wall into the receptacle and secures the placement of the smart card in the receptacle; and
    a plurality of contacts residing within the receptacle where the plurality of contacts connects to a smart chip within the smart card upon placement of the smart card in the receptacle.

2. The card reader according to claim 1, wherein the plurality of contacts resiliently contact the smart chip within the smart card.

3. The card reader according to claim 1, further comprising:
   a contact plate within the receptacle of the card reader that includes the plurality of contacts; and
   a plurality of electrical leads from the contact plate.

4. A card reader for usage with a smart card to reduce card abrasion comprising:
   an open receptacle, where the receptacle includes a bottom surface, a closed lateral side, a first longitudinal side, a second longitudinal side, and an open lateral side;
   a one-piece receptacle lip that forms a placement tab extending from the first and second longitudinal sides and the closed lateral side over the bottom surface into the receptacle and securing the placement of the smart card in the receptacle along the entire length of the one-piece receptacle lip; and
   a plurality of contacts residing within the receptacle where the plurality of contacts connects to a smart chip within the smart card upon placement of the smart card in the receptacle.

5. The card reader according to claim 4, wherein said one-piece receptacle lip that forms the placement tab extends into the receptacle at a fixed spacing from the bottom surface and said plurality of contacts reside on a fixed contact pad on the bottom surface of the receptacle in an area uncovered by the receptacle lip, said lip resiliently maintains the smart card in contact with the plurality of contacts on the uncovered fixed contact pad.

6. A method of having a card restraining tab smart card interface to reduce card abrasion comprising:
   providing an open receptacle to minimize card area contact within a smart card reader;
   enclosing the open receptacle on three sides of the receptacle with a first lateral wall, a second lateral wall and a longitudinal wall;
   attaching placement tabs along the first lateral wall, second lateral wall and longitudinal wall;
   inserting a smart card into the receptacle and engaging said placement tabs;
   placing a contact plate within the smart card reader;
   aligning the contact plate with a smart chip residing on a smart card; and
   resiliently connecting the contact plate to the smart chip.

* * * * *